(12) United States Patent
Stone et al.

(10) Patent No.: US 6,422,535 B1
(45) Date of Patent: Jul. 23, 2002

(54) KNIFE GATE VALVE

(75) Inventors: Jon T. Stone, Easton; Torrey G. Sipos, Catasauqua, both of PA (US); Douglas R. Dole, Whitehouse Station, NJ (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 09/726,705

(22) Filed: Nov. 30, 2000

(51) Int. Cl.[7] ................................................. F16K 3/02
(52) U.S. Cl. ...................................... 251/327; 251/328
(58) Field of Search ................................. 251/327, 328

(56) References Cited

U.S. PATENT DOCUMENTS

| | | |
|---|---|---|
| 1,381,938 A | 6/1921 | Sheafor |
| 2,007,036 A | 7/1935 | Cornell, Jr. |
| 2,732,170 A | 1/1956 | Shand |
| 2,913,220 A | 11/1959 | Cover |
| 3,198,484 A | 8/1965 | Martindale |
| 3,293,342 A | 12/1966 | Grove |
| 3,442,286 A | 5/1969 | Anderson et al. |
| 3,941,349 A | 3/1976 | Pierson |
| 3,992,929 A | 11/1976 | Connell |
| 4,062,516 A | 12/1977 | Grove |
| 4,257,447 A | 3/1981 | Clarkson |
| 4,326,698 A | 4/1982 | Constantino |
| 5,004,210 A | 4/1991 | Sarno |
| 5,020,776 A | 6/1991 | Owens et al. |
| 5,082,247 A | 1/1992 | Owens et al. |
| 5,197,512 A | 3/1993 | Lev |
| 5,330,158 A | * 7/1994 | Ellich et al. ................. 251/327 |
| 5,338,006 A | * 8/1994 | McCutcheon et al. ...... 251/327 |
| 5,890,700 A | * 4/1999 | Clarkson et al. ............ 251/327 |

OTHER PUBLICATIONS

DeZurik Bi–Directional Knife Gate Valve, 1 page (undated).
Slurry Knife Gate Valve, 1 page (undated).

* cited by examiner

*Primary Examiner*—Kevin Lee
(74) *Attorney, Agent, or Firm*—Synnestvedt & Lechner LLP (57) ABSTRACT

A knife gate valve having modular ends for attachment to pipe ends is disclosed. A knife gate is movable transversely to a fluid flow path and constrained by guide plates positioned along opposite edges of the gate. Pairs of spacer rings each supporting a respective valve seat are positioned on opposite sides of the guide plates, the seats sealingly interfacing with the knife gate and the guide plates. Modular ends formed from tubes with flanged ends extend outwardly from the valve in opposite directions for connection to the pipe ends. The flanged ends of the tubes interface with the seats. End plates are attached on opposite sides of the guide plates. The end plates have openings which receive the tubes and surfaces around the openings which engage the flanged ends of the tubes and capture the modular ends, seats and spacer rings against the knife gate and the guide plates.

20 Claims, 10 Drawing Sheets

KNIFE GATE VALVE

FIELD OF THE INVENTION

This invention relates generally to the field of valves for controlling the flow of a fluid in a conduit or pipe; and more specifically to valves having a slideable gate for establishing the position of the valve in any one of a plurality of positions including and between a fully open position at which a maximum flow of fluid through the conduit in which the valve is placed occurs, and a fully closed position at which zero flow of fluid through the conduit in which the valve is placed occurs.

Specifically, a knife gate valve, using modular, interchangeable end components, and common body, internal and topworks components, that offers versatility for use in multiple applications, is disclosed.

BACKGROUND OF THE INVENTION

Previously known knife gate valves have typically been of the wafer type, with standardized end-to-end dimensions, to allow for connection in flanged systems. Although this has been a widely accepted method of installing knife gate valves, it has several drawbacks. First, the use of a wafer type valve prevents the use of the valve in any system other than a flanged piping system, without the use of transition flanges on the mating piping. Second, installation time for a flanged system is considerably greater than for a grooved or threaded system. Third, the valve must be removed from the line in order to replace or repair the valve seats.

Accordingly, one object of the present invention is to provide a gate valve that incorporates flanges into the main body of the valve to secure one of a number of different modular end components to the valve, the end components being adapted to interface with other than flanged systems. This provides two benefits to the user. First, the user does not have to purchase or install transition flanges, thereby saving material and labor costs.

Second, valve installation time and labor cost are reduced from that required to install a flanged joint, to only that needed to assemble a joint compatible with the modular end component, such as a threaded, plain end, or grooved pipe joint. This can be a significant factor in situations such as in mining applications, where valve replacement is frequent and the need to minimize shutdown time is critical.

It is a further object of the present invention to provide a gate valve in which common internal components can be utilized with several different modular end component configurations. Internal components and topworks components of the gate valve of the present invention are designed to function as common parts, such that the same parts can be used regardless of the end components selected. In effect, the end components become interchangeable parts. Internal parts of the gate valve differ only between resilient seated and metal seated, as well as between metallic and non-metallic (e.g., plastic) versions.

A still further object of the present invention is to provide a gate valve that can be used, or easily modified for use, in multiple markets and in multiple types of systems. The modular end components supplied as part of the valve body can be provided with any of several pipe end configurations such as grooved, threaded, butt-weld, and plain end. Furthermore the modular end components can be fabricated from a variety of materials, such as ductile iron, steel, stainless steel, plastic and aluminum. This versatility allows the use of the valve in a wide variety of applications.

A still further object of the present invention is to provide a gate valve with maintenance, repair, and ease of seat replacement in mind. Seat repair, or replacement, requires the disassembly of the valve. However, the valve does not have to be removed from the line to achieve seat replacement. The valve is designed to be disassembled in line such that the end plates can be pulled back from the center plates, allowing, the seats and seat rings to be pulled from the assembly and replaced. Upon disassembly, the topworks bracket and operator remain attached to one end plate, with the gate in the open position, while the other end plate is free to move along the pipeline. The topworks bracket is slotted on both sides for the purpose of being able to easily remove the free cast end plate.

Yet another object of the present invention is to provide a gate valve that utilizes a pair of "cup-shaped" cast end plates, which abut against a common center plate, and are assembled using a common set of bolts, to house the valve internals (modular end components, seat rings, and seats).

Another object of the present invention is to provide a gate valve that is highly modular and is capable of being adapted to accommodate several different types of end connections by simply switching out only the end components, and in certain cases, additionally, the seats and seat rings.

Another object of the present invention is to provide a gate valve having a limited compression seat design, as well as means for accommodating volumetric displacement of the valve seats.

Another object of the present invention is to provide a gate valve, which utilizes plastic end components, especially polyethylene, in the valve body, in a pre-stressed and fixed dimension condition, to account for dimensional changes due to thermal changes and viscoelasticity.

Another object of the present invention is to provide a knife gate valve that is capable of being directly attached to plastic piping systems, especially polyethylene (PE) and polyvinyl chloride (PVC), by means of fusing, fusion welding, epoxy, or mechanically attaching via grooves, or other means.

Another object of the present invention is to provide a gate valve that provides direct access to plastic piping systems, by providing an internal diameter (i.d.) that directly matches the piping system i.d. and provides an uninterrupted flow path through the valve.

Another object of the present invention is to provide a gate valve that is capable of direct attachment to a grooved piping system, without the need for external attachment of a transition fitting.

Another object of the present invention is to provide a gate valve that can be disassembled and repaired in line.

Another object of the present invention is to provide a gate valve that has the capability for a "cross-over" connection at the valve using alternate modular end component types. For example, a valve could be provided with grooved metallic modular end component on one side of the valve, and a plain end plastic end modular end component on the opposing side. Another typical combination is the use of a grooved metallic modular end component on one side, with a plain metallic modular end component on the opposing side.

SUMMARY OF THE INVENTION

The present invention is based on a gate valve, particularly a knife gate valve, that incorporates modular end components into the main body assembly, and offers the ability to interchange the end components to allow the valve to be modified to match customer needs. The end configurations with which the valve can be supplied are virtually unlimited, and include grooved, plain end, threaded, and welded.

Ends can be supplied with rubber or polyurethane lining, and can be made from several materials including steel, iron, plastic (PE, PVC, PP, FRP, etc.), stainless steel, and aluminum.

The valve features a full round opening port. A resilient seated version is designed to be drop tight, and bi-directional. "Wetted" parts are limited to the end components, the seats, and the gate in the full open and full closed positions. Upper support plates and brackets are designed to be versatile and are capable of accommodating several different types of commercially available actuators.

The assembly focuses on using matching end plates to house modular flange ends, seat rings, and seats. The design allows the modular ends to be attached within the assembly, without passing bolts through the flange. The interaction of the internal cavity, or cup shaped element of the end plate with the thickness dimension of the flange end, and the seat ring, controls the compression on the seats of the valve.

In its preferred embodiment the knife gate valve according to the invention has a flow path for fluid flow through the valve. The knife gate valve is attachable to pipe ends for integration into a piping network and comprises a knife gate having a planar surface oriented transversely to the flow path and movable within the valve transversely into and out of the flow path. A pair of guide plates are positioned along opposite edges of the knife gate for guiding its motion. The guide plates are substantially coplanar with the knife gate. First and second seals are positioned on opposite sides of the knife gate and the guide plates, the seals surrounding the flow path and sealingly engaging the guide plates. The seals are also sealingly engageable with the knife gate upon movement of the knife gate into the flow path and sealingly engageable with one another upon movement of the knife gate out of the flow path.

First and second elongated tubes comprising the modular ends are positioned coaxially with the flow path on opposite sides of the knife gate. Each of the tubes has a respective flange positioned at one end thereof, the flange extending radially outwardly therefrom. The one end of each of the tubes faces the knife gate, and each of the flanges has a first surface facing the knife gate which sealingly engages one of the seals. Each of the flanges also has a second surface opposite the first surface.

First and second end plates are positioned on opposite sides of the knife plate. Each of the end plates has a respective opening adapted to receive one of the tubes. Each of the end plates also has a respective surface surrounding the opening for engaging the second surface of one of the flanges of the tubes. The end plates are attached to the guide plates and capture the flanges and the seals therebetween. The tubes extend outwardly from the end plates in opposite directions and are attachable to the pipe ends. The knife gate valve also includes means for moving the knife gate mounted on the valve.

One of the tubes comprising the modular ends may have a circumferential groove positioned in spaced relation to an end opposite the flange, the groove adapting the one tube for attachment to the pipe end by means of a mechanical pipe clamp. The tubes and the flange on the tubes may be comprised of metal or plastic.

Preferably, the seals are comprised of an elastomeric material. First and second spacer rings are positioned on opposite sides of the knife gate coaxially with the flow path. The first spacer ring is between one of the flanges and the guide plates, and the second spacer ring is between another of the flanges and the guide plates. Each of the spacer rings has an inwardly facing shoulder respectively engaging and radially supporting one of the seals and preventing motion of the seals when the knife gate is moved relatively thereto.

Preferably, the seals comprise a first lobe extending circumferentially around the seal and positioned between one of the flanges and the spacer rings to effect a fluid tight seal therebetween. A second lobe is attached to the first lobe and also extends circumferentially around the seal, the second lobe being positioned radially inwardly of the first lobe and engaging one of the flanges. A sealing face extends circumferentially around the seal and is positioned opposite the second lobe for engagement with the knife gate. A displacement cavity is positioned between the first and the second lobes and extends circumferentially around the seal. With this configuration of seal the first lobes are compressed between the flanges and the spacer rings causing volumetric expansion of the sealing faces against the knife gate and the second lobes against the flange for effecting a fluid tight seal therebetween when the knife gate is in the flow path, the sealing faces of each the seal being otherwise compressed into sealing contact with one another when the knife gate is removed from the flow path.

Preferably, the spacer rings each have a respective predetermined thickness for establishing a desired compression of the first lobes between the flanges and the spacer rings and the sealing faces against the knife gate, the desired compression being achieved when the spacer rings respectively engage both the flanges and the guide plates thereby separating the flanges and the guide plates by the predetermined thickness of the spacer rings.

Preferably, the knife gate valve further comprises an aperture positioned between the guide plates substantially in the plane of the knife gate. The aperture is positioned at a lowermost point of the knife gate valve and is in fluid communication with the flow path for allowing solids in the flow path to pass outwardly from the knife gate valve through the aperture.

DETAILED DESCRIPTION OF PREFERRED EMBODIMENTS OF THE INVENTION

The invention concerns a gate valve for placement and use in a conduit for carrying a fluid. The gate valve according to the invention has a moveable gate capable of alternatively assuming any of a plurality of positions in a range between and including a fully open position and a fully closed position for alternatively completely permitting or completely stopping the flow of fluid through the conduit in which the gate valve is positioned, or for allowing a partial flow through the conduit. The partial flow ranges between a maximum flow when the gate is in the fully open position and a zero flow when the gate is in the fully closed position. The gate is slidably mounted in a gate housing having a first modular end and a second modular end such that the first and second modular ends are capable of being mechanically attached to the valve in a fluid-tight arrangement, the moveable gate being slidably mounted in between the first and second modular ends in a direction perpendicular to a longitudinal main axis of flow through the gate valve and conduit. The first and second modular ends comprise first and second conduit connectors. Each of the first and second conduit connectors is attachable to one of a corresponding first and second conduit sections into which the conduit is divided by a space provided therebetween for the mechanical and fluid-sealable interposition of the gate valve. The communication and attachment of the first and second conduit connectors occurs at respectively corresponding first and second conduit section ends such that the first and second conduit section ends each has a respective face, which faces are perpendicular to the main longitudinal axis of flow through the gate valve and conduit. The first and second conduit section ends are located at respective ends of the first and second conduit sections, proximate to and on either side of the gate valve, with the first and second conduit connectors forming an integral part of the gate housing, such that the first and second conduit connectors are capable of being connected to the respectively corresponding first and second conduit section ends in a manner such that the connection is effected without the use of separate transition flanges and their associated connecting nuts and bolts. The gate valve further comprises a gate actuator for moving the position of the moveable gate among its plurality of positions.

The conduit connectors may be configured to have couplings which are attachable to the conduit section ends according to a number of designs known in the art, such as are disclosed, for example, in U.S. Pat. No. 4,639,020 to Rung et al, for "Self-Adjusting Pipe Clamp and Coupling"; U.S. Pat. No. 4,611,839 to Rung et al, for "Self-Adjusting Pipe Clamp and Coupling"; U.S. Pat. No. 4,522,434 to Webb, for "Multiple Key Segmented Pipe Coupling"; U.S. Pat. No. 3,054,629 to Piatek, for "Pipe Couplings"; U.S. Pat. No. 3,024,046 to Frost et al, for "Couplings With Pipe Gripping Means for Plain End Pipe"; and U.S. Pat. No. 2,439,979 to Krooss, for "Pipe Coupling", all of which are incorporated herein, by reference, in their entirety.

Figure 1:
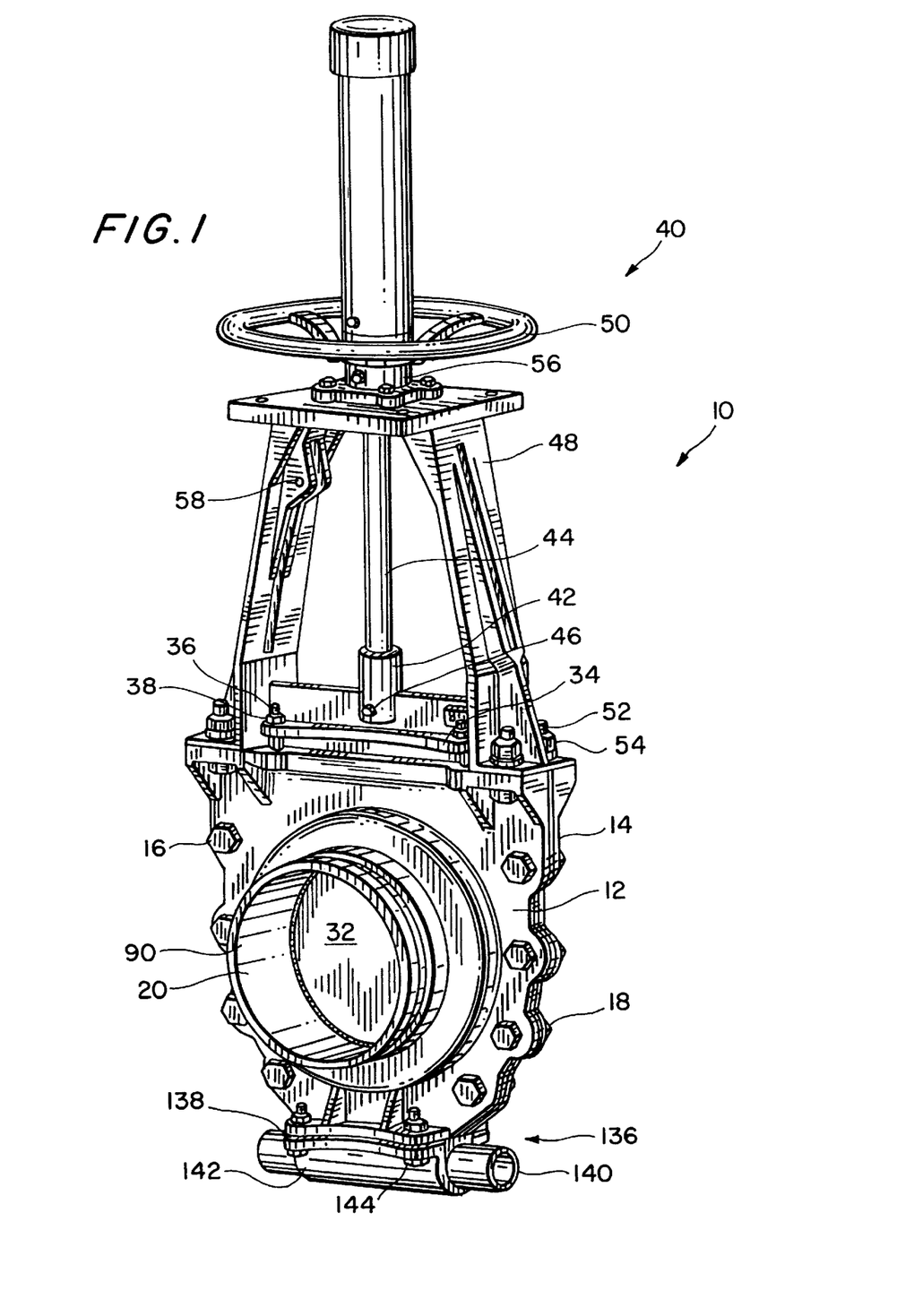
FIG. 1 is an overall perspective view of a knife gate valve according to the present invention, with grooved ends, shown in a closed position.
Figure 2:
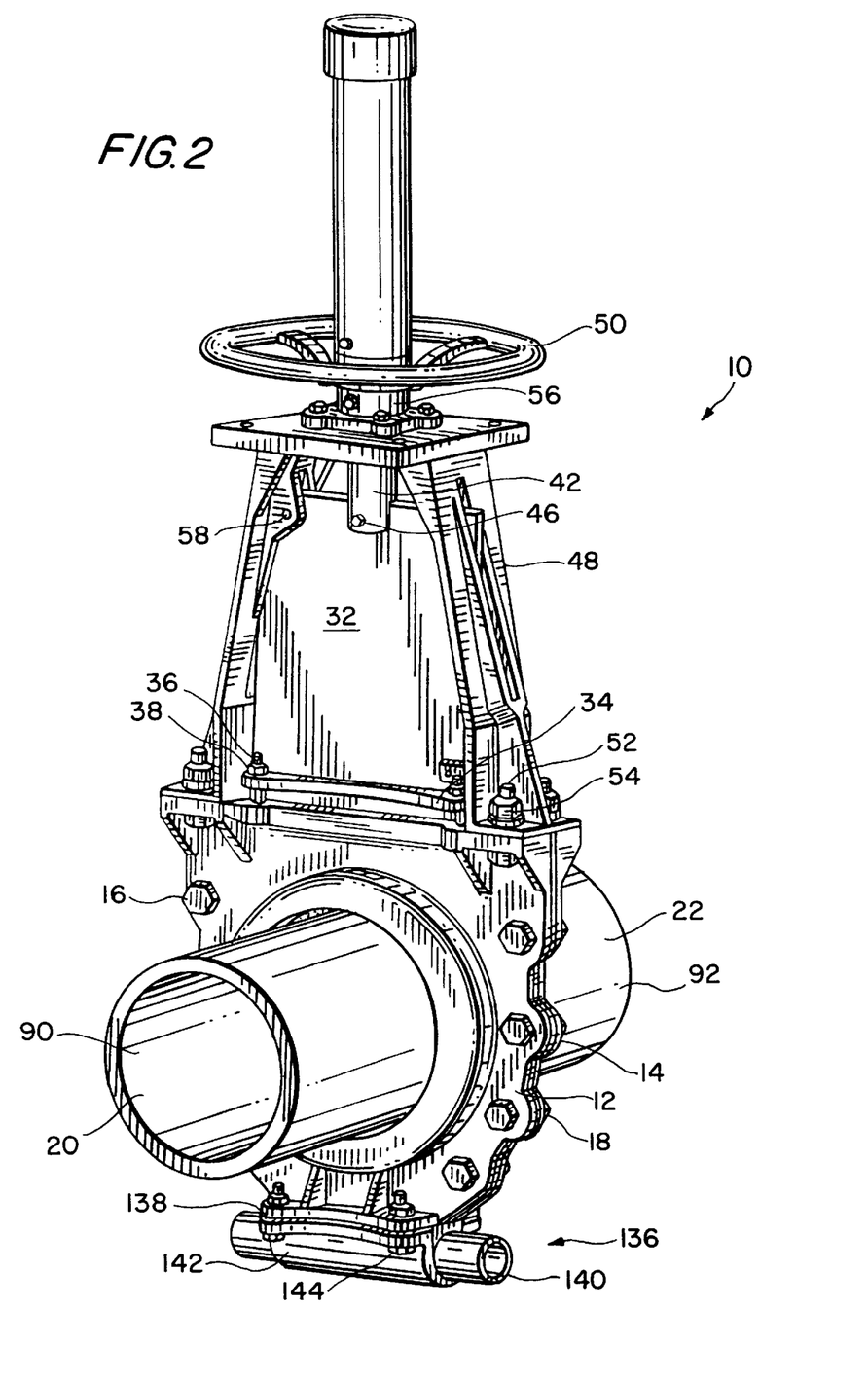
FIG. 2 is an overall perspective view of a knife gate valve according to the present invention, with plain plastic or metal ends, shown in an open position.

Referring now to FIGS. 1 and 2, wherein like numbers designate like elements of the apparatus, a knife gate valve 10 according to the present invention is shown in overall view, in respectively a fully closed position, and a fully open position. The knife gate valve 10 includes a pair of opposite end plates 12 and 14 which may be formed by casting, forging, stamping, molding, or fabricated from welded plate and machined components. The end plates are fastened to the valve by a plurality of bolts 16 with accompanying nuts 18. A pair of modular ends 20 and 22 are each retained to the valve 10 by a corresponding end plate 12 and 14 interacting with respective flanges 94 and 96 shown in FIG. 4 and described below.

Figure 3:
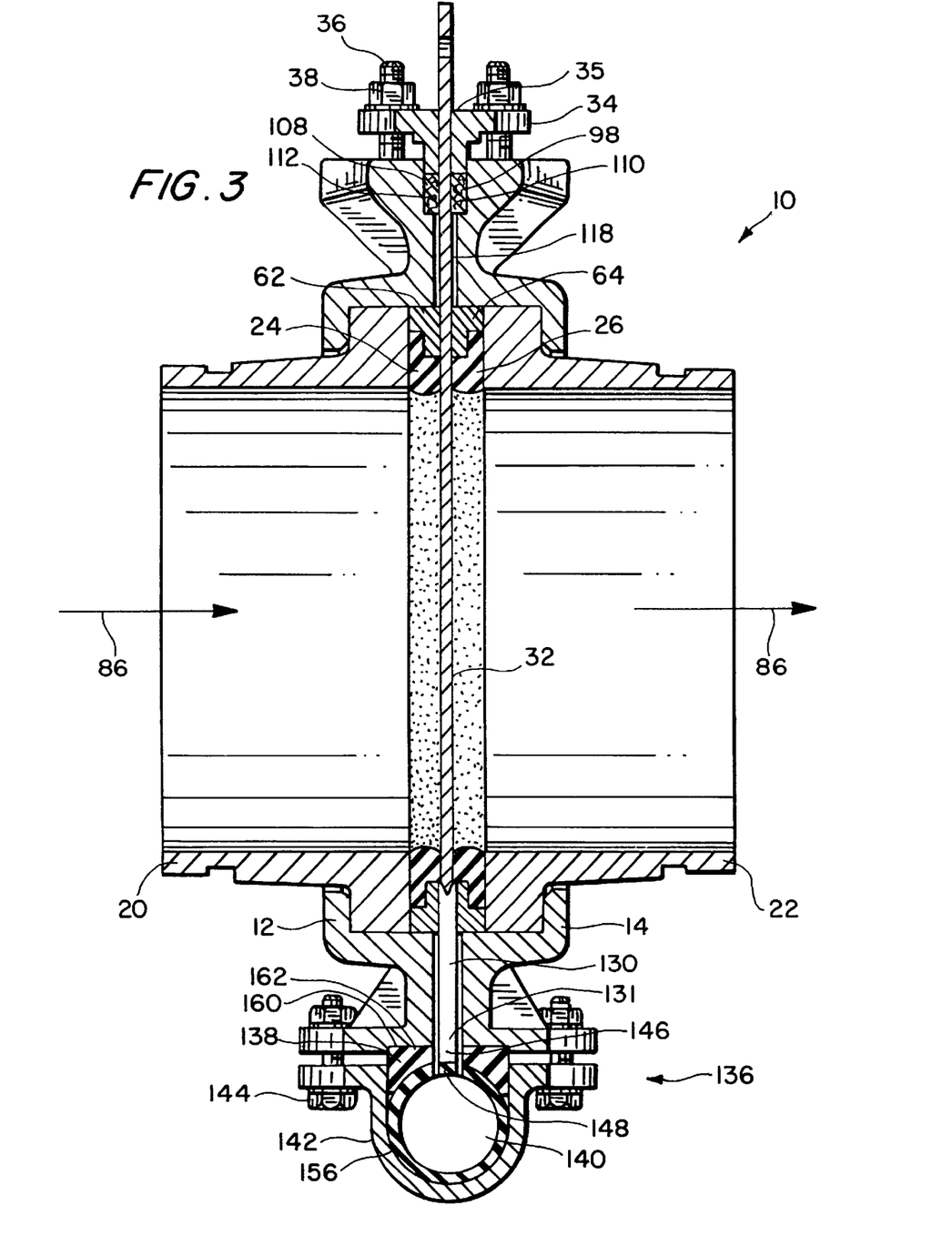
FIG. 3 is a longitudinal sectional view of the main body assembly of a knife gate valve according to the present invention.
Figure 4:
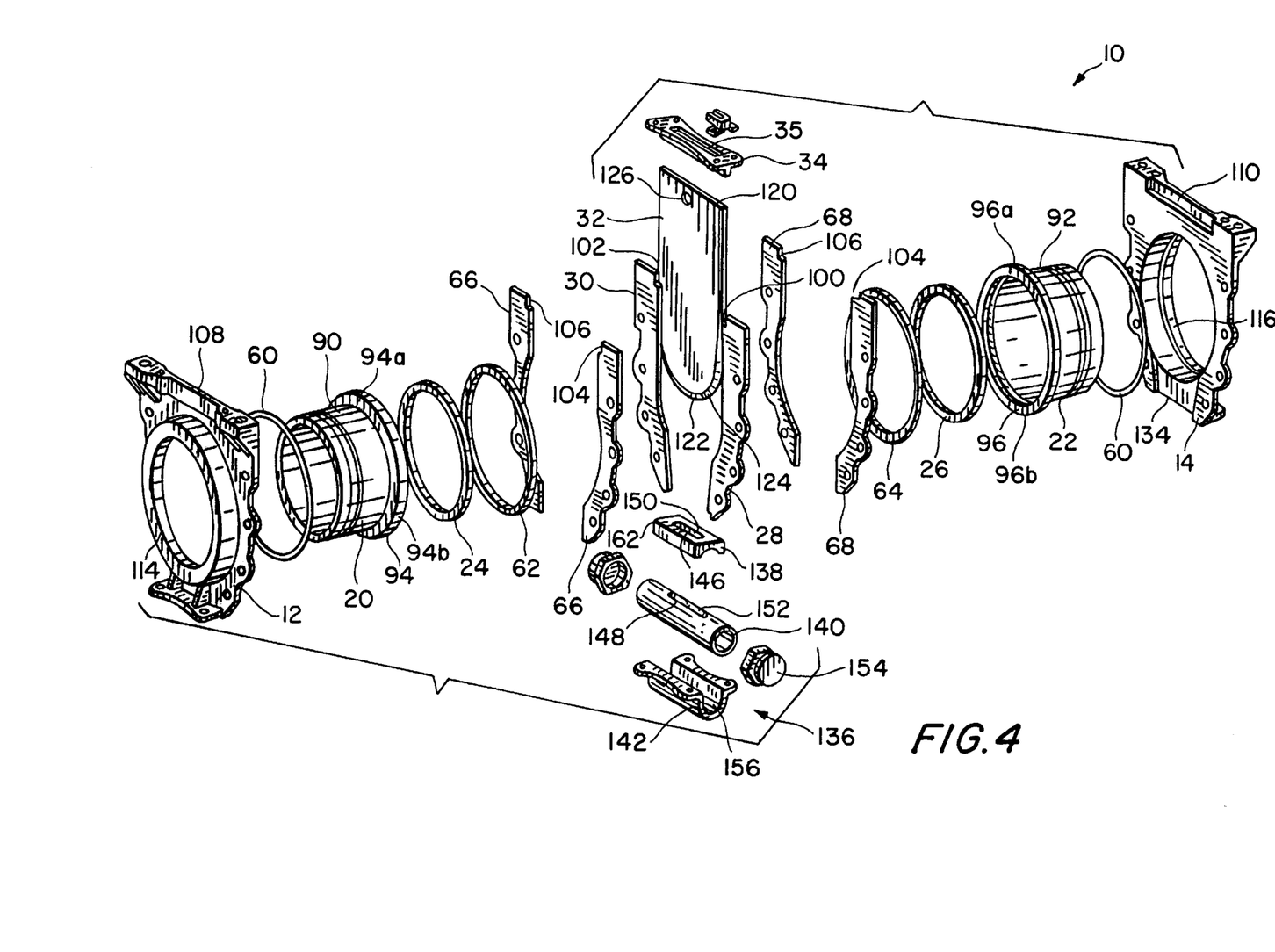
FIG. 4 is an exploded perspective view of the main body assembly of a knife gate valve according to the present invention.

FIGS. 3 and 4 also show a pair of valve seats 24 and 26 associated with each end plate 12 and 14. A pair of guide plates 28 and 30 are positioned between the end plates 12 and 14 and a knife gate 32 is movably operable between the end plates. A packing gland 34 for providing a fluid-tight seal around the top of the gate is positioned at the top of the knife gate 32 and is attached thereto by a plurality of bolts or studs 36 and their accompanying nuts 38.

As shown in FIGS. 1 and 2, valve opening and closing means 40 comprises a collar 42 for attaching one end of a threaded shaft 44 to the knife gate 32. Attachment of the shaft to the knife gate preferably uses at least one fastener, such as a Clevis pin 46. Opening and closing means 40 further includes a topworks bracket 48 for supporting the threaded shaft 44 and a handwheel 50 attached to an opposite end of the threaded shaft, the topworks bracket being attached to the end plates 12 and 14 by a plurality of bolts 52 with accompanying nuts 54. A bushing assembly 56 provides guidance for the threaded shaft 44 as it passes through the topworks bracket to the hand wheel 50.

The knife gate valve 10 may also include a lockout pin 58 for securing the knife gate valve in the fully open position, as shown in FIG. 2.

Referring now to FIG. 4, the main body assembly of the knife gate valve 10 is shown in exploded view wherein each end plate 12 and 14 is in communication with a respective backface gasket ring 60 positioned between each end plate and one end of a respective modular end 20 and 22. Valve seats 24 and 26 each communicate with an opposite end of a respective modular ends 20 and 22. Seat spacer rings 62 and 64 are positioned interfacing with the seats 24 and 26 respectively on a side of the seat opposite to the modular ends 20 and 22. A pair of body gaskets 66 and 68 are positioned against respective guide plates 28 and 30 with the seats 24 and 26 and the seat spacer rings 62 and 64 therebetween. Guide plates 28 and 30 surround the bottom and two sides of the knife gate 32. knife gate 32 is slideable between the two parts of the guide plates and the packing gland 34. The packing gland provides a fluid-tight seal at the top of the gate. The end plates 12 and 14 interface with the substantially crescent-shaped body gaskets 66 and 68, two gaskets being positioned per side. The body gaskets in turn interface with the two guide plates 28 and 30, as shown in FIGS. 1 and 4. The two end plates 12 and 14, the body gaskets 66 and 68, and the two guide plates 28 and 30 each have fastening holes arranged in an identical pattern. The two end plates, the body gaskets, and the two guide plates are fastened together by running fasteners through the concentric fastening holes. The fasteners are typically selected from, but are not limited to bolts, studs, and screws. This configuration allows the knife gate valve 10 to be disassembled without disengaging the modular ends 20 and 22 from piping or conduit to which they are attached as explained in more detail below.

Figure 5:
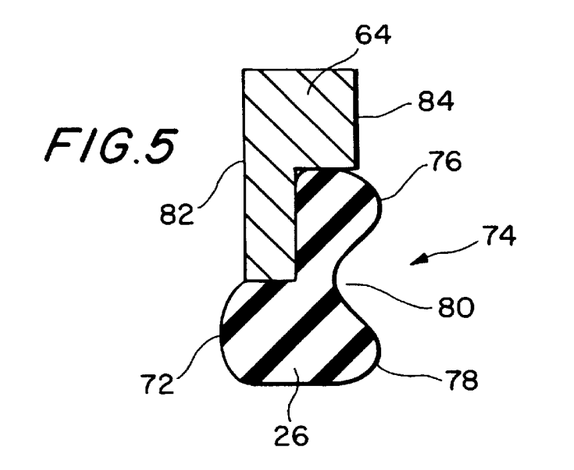
FIG. 5 is an enlarged partial cross sectional view of the seat and seat ring of a knife gate valve according to the present invention.

Referring now to FIG. 5, the cooperative, fluid-tight seal arrangement between seat 26 and seat spacer ring 64 is shown. Seat 26 has an outer arcuately-shaped seating or sealing face 72 and a complex-shaped inner surface 74 which includes a convexly-shaped inner lobe 76 and a convexly-shaped outer lobe 78. A concavely-shaped displacement cavity 80 is positioned between the inner and outer lobes 76 and 78. The seat spacer ring 64 has an outer surface 82 that is in contact with the guide plates 28 or 30 and an inner surface 84 that is in contact with a flange 96 of the modular end 22 (see FIGS. 4, 6a and 6b). Seat spacer ring 62 and seat 24 are similar and will not be described in detail.

Figure 6A:
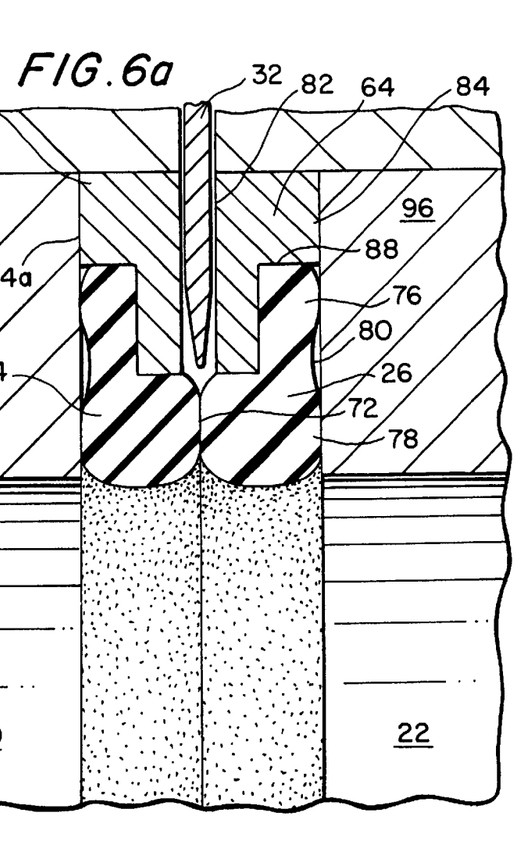
FIGS. 6a–b are enlarged partial views of the seat and seat ring of a knife gate valve according to the present invention, shown in an assembled condition, in a full open and a full closed position, respectively.
Figure 6B:
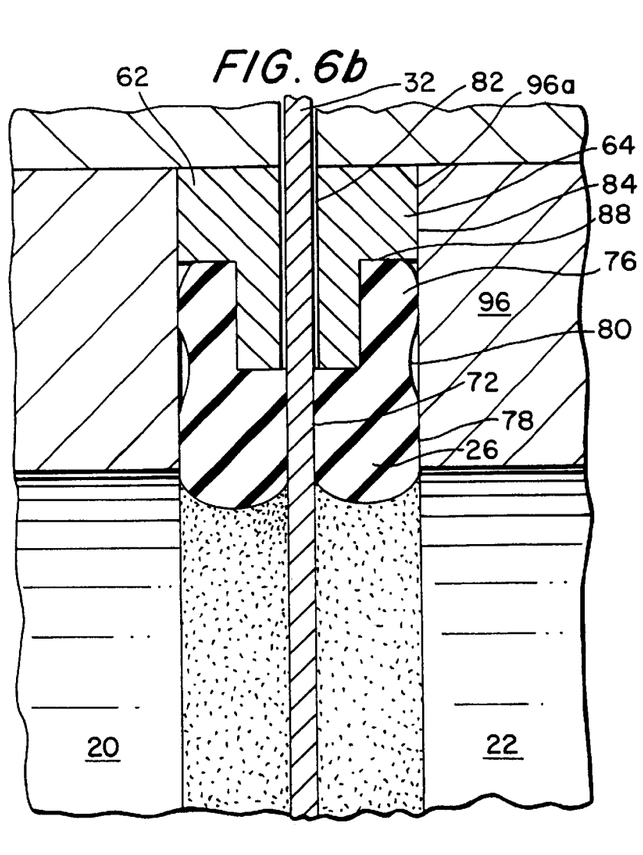

FIGS. 6a and 6b show the cooperation between seats 24 and 26 and seat spacer rings 62 and 64 of the knife gate valve 10. The seat spacer rings have an "L"-shaped cross-section providing an inwardly facing shoulder 88 and are assembled against respective inwardly facing sides 94a and 96a of flanges 94 and 96 extending from the modular ends 20 and 22 and described in detail below. The seats 24 and 26, preferably elastomeric components, are positioned within the respective recessed shoulder portions 88 of the "L"-shaped seat spacer rings 62 and 64. In FIG. 6a, the seats 24 and 26 and seat rings 62 and 64 are shown as when the knife gate valve is in a full open position; while in FIG. 6b, the seats and seat rings are shown as when the knife gate valve is in a full closed position. In the full closed position, the seat rings do not actually come in contact with the gate itself, but abut against the guide plates 28 and 30 over approximately 60% of their face. In the preferred embodiment shown the valve seats are one-piece, double-lobed, and are capable of limited compression. The valve seats further provide an atmospheric seal when the gate is in an open position as shown in FIG. 6a with the sealing faces 72 of the seats 24 and 26 in sealing contact.

FIG. 3 shows a fully assembled knife gate valve 10 with both modular ends 20 and 22 and the seats 24 and 26 in place providing a fluid-tight seal between the gate valve end plates 12 and 14 and the modular ends 20 and 22. Upon assembly, a cavity 118 is formed between the faces of the end plates 12 and 14. Cavity 118 is bordered by the body gaskets 66 and 68 and the guide plates 28 and 30. This cavity forms a passage intended for the travel of the knife gate 32. The thickness dimension of the guide plates 28 and 30, combined with the thickness of the body gaskets 66 and 68 is greater than the thickness of the knife gate, allowing the gate to travel in and out of the valve body in a direction transverse to the flow path 86 of the valve.

As shown in FIG. 4 the knife gate 32 comprises a thin plate with a rectangular top portion 120 and a semi-circular lower portion 122. The outer edge 124 of the lower portion is beveled on both sides, to a near wedge-shape, to allow the gate to part the valve seats 24 and 26 as it is operated to the closed position. A hole 126, located near the top on the centerline of the gate, allows attachment of the knife gate to the threaded shaft 44 by the clevis pin 46. A second hole 128, positioned near the top of the knife gate 32 but located off its centerline, receives lockout pin 58 for fixing the knife gate in the full open position.

Figure 7:
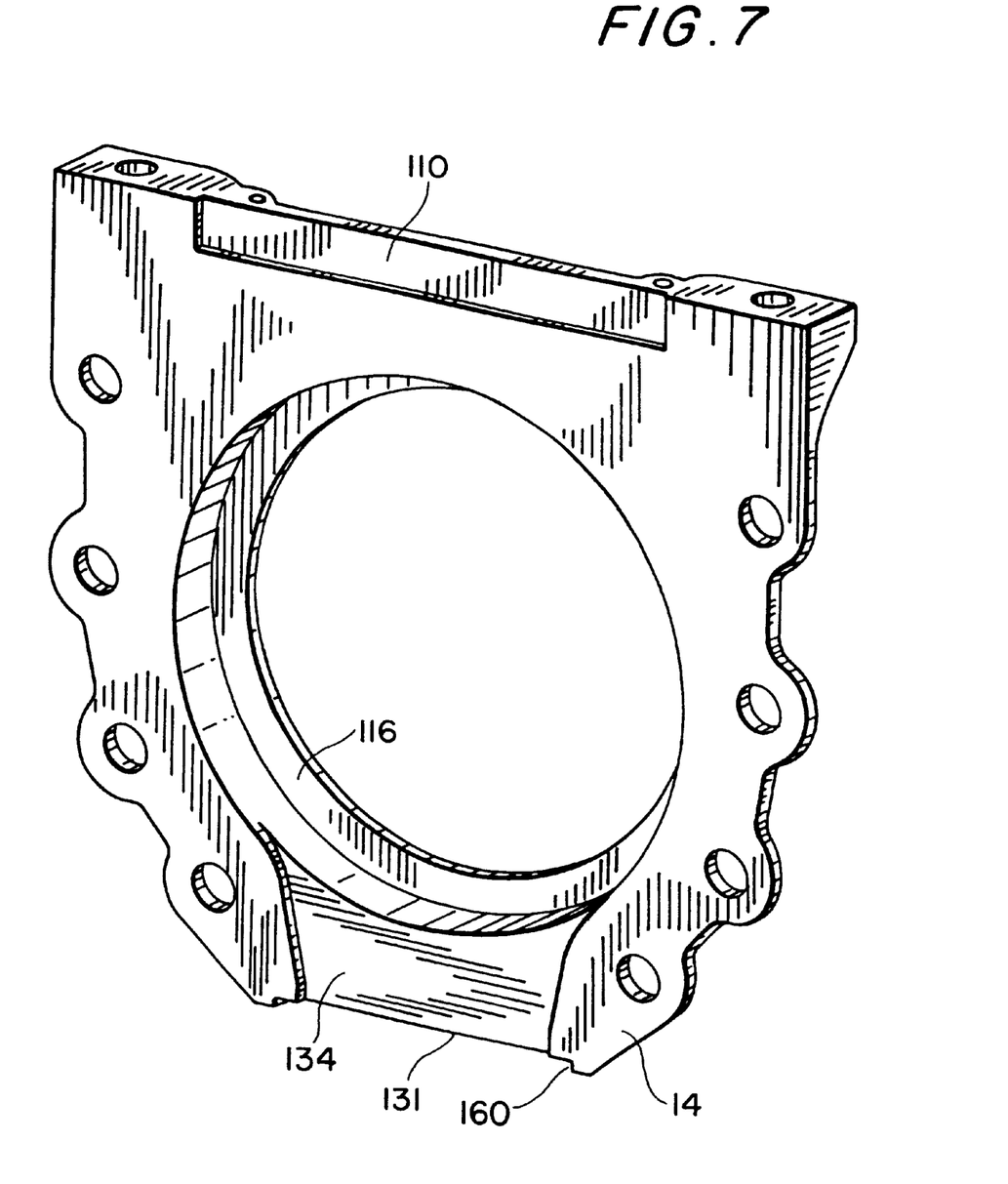
FIG. 7 is a detailed perspective view of the inside face of an end plate of a knife gate valve according to the present invention.

A second cavity 130 is formed between the two end plates 12 and 14. The second cavity 130 is located below the cavity 118 for the travel of the knife gate 32, and is a continuation of that cavity. Respective recesses 134 (see FIGS. 4 and 7) in the lower portions of each of the two end plates 12 and 14 further enlarge the lower cavity 130 and form an aperture 131 (see FIGS. 3 and 10) between the flow path through the valve and the ambient.

The second cavity 130 and its opening 131 function as a flush port providing a passage through which solids which would otherwise accumulate between the valve seats 24 and 26 are allowed to pass outwardly through the bottom of the valve. This prevents a solids build-up around the bottom half of the seats, where the solids may harden and cause obstruction of the operation of the gate to a fully closed position.

There are at least three alternative configurations for the flush port. In the first embodiment shown in FIGS. 1, 3 and 4, a flush port assembly 136 includes a flush port seal 138, a flush port tube 140, a flush port cradle 142, and flush port fasteners 144. The flush port seal 138 has a substantially "C"-shaped cross section. The flush port seal has an elongated slot 146, which runs along its centerline for about 80% of its length, and penetrates through the entire thickness dimension of the seal. The slot 146 contains full radii at each end that correspond to the width of the slot.

The flush port tube 140 is typically made from a length of common pipe. A slot 148 is machined through the wall of the pipe. The slot 148 on the flush port tube matches the slot 146 on the flush port seal, however the dimensions of the slot 148 on the flush port tube are slightly smaller than the slot dimensions on the flush port seal 146. This is to allow for volumetric displacement of the flush port seal upon compression. When compressed during assembly, the walls 150 of the slot 146 of the flush port seal 138 flow inwardly to match the walls 152 of the slot 148 of the flush port tube 140. This creates a smooth unobstructed passage for solids that are forced from between the seats 24 and 26.

The flush port tube 140 can be provided with threaded ends, or grooved ends, for attachment to a water circulation line (not shown), in which case the flush port cavity 130 and aperture 131 is continually cleaned, or flushed, by water passing through the system. The flush port tube can also be provided with end caps 154, either threaded or grooved, in which case the flush port tube acts as a collection cartridge. In this case, the flush port cavity 130 and aperture 131 in the valve body assembly are cleaned manually.

Figure 10:
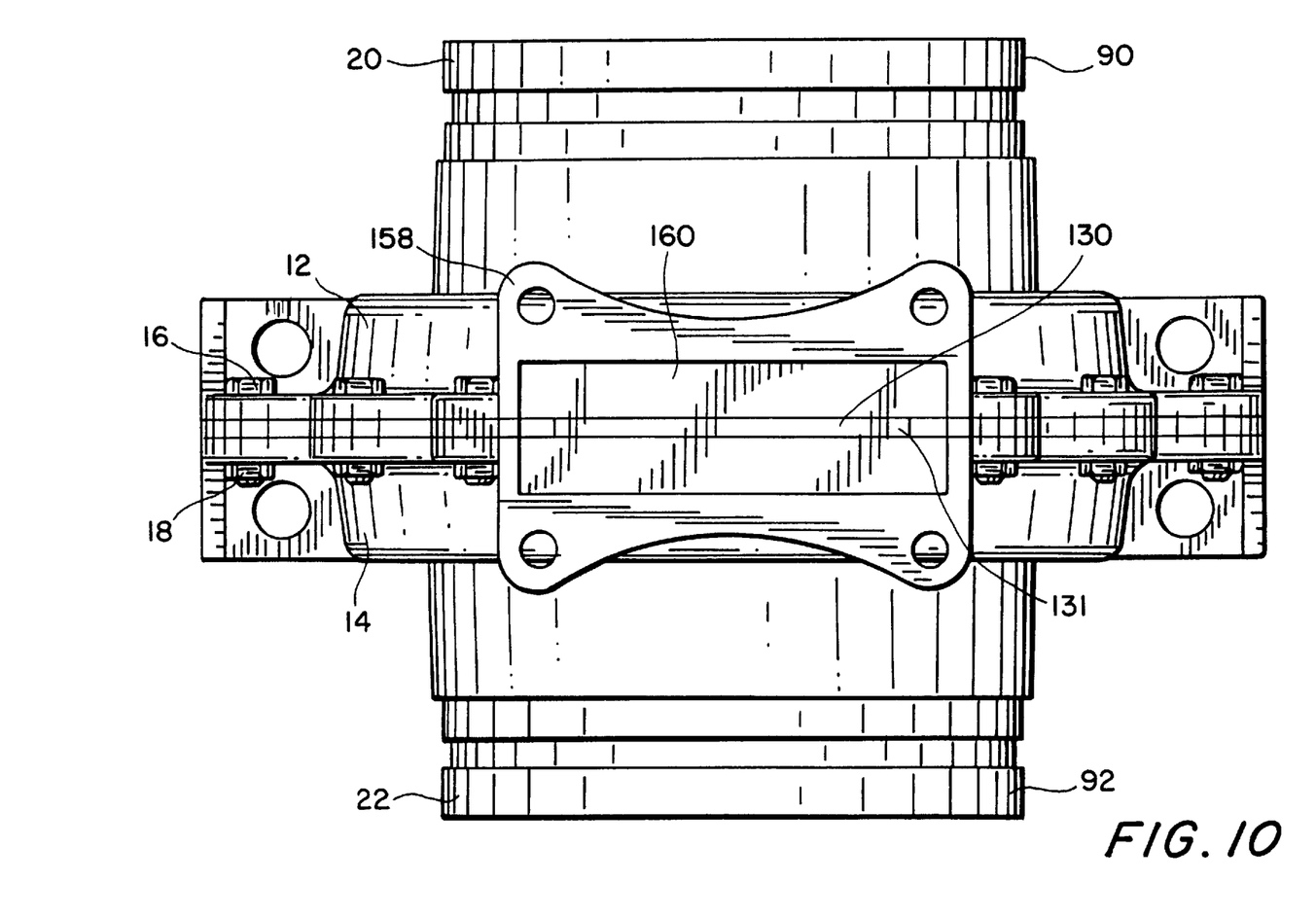
FIG. 10 is a bottom view of one embodiment of a knife gate valve according to the present invention, showing details of the flush port attachment assembly.

The flush port cradle 142 serves as a housing for the flush port tube 140 and flush port seal 138. When viewed from the end, the inner surface 156 of this part forms a U-shape as best shown in FIG. 3. The lower round portion of the inner surface 156 acts as a seat for the flush port tube 140 and the straight vertical walls act as retainer-walls for the flush port seal 138. When viewed from the bottom as shown in FIG. 10, the flush port cradle has a rectangular profile with bolt hole bosses 158 protruding from each corner.

Upon connection of the flush port assembly 136 to the bottom of the valve 10, the four bolt holes in the flush port cradle are aligned to a matching set of four bolt holes in the bottom of the assembled valve body. The flush port seal is inserted into a flush port seal cavity 160 on the bottom of the valve formed by recesses in the bottom of the end plates (see FIGS. 7 & 10). When assembled, slight interference exists between the outer edges of the flush port seal, and the inner edges of the flush port seal cavity.

When the flush port assembly is connected to the bottom of the valve assembly, fasteners 144, upon tightening of the fasteners, the flush port seal 138 will begin to compress. The energy applied to the flush port seal via tightening of the fasteners will cause the seal to try to expand outwardly in the two planes perpendicular to the axis of applied stress.

The flush port seal cavity 160 is designed to a depth sufficient to prevent the top plane 162 of the flush port seal 138 from expanding in the plane of the seal. This allows energy to be concentrated into sealing along the top, and around the top edges of the flush port seal. The straight portion of the inner walls of the flush port cradle limit the outward expansion of the flush port seal. Energy transferred to the bottom surface of the flush port seal, which runs tangent to the outer wall of the flush port tube, causes a seal to be effected between the flush port seal, and the outer surface of the flush port tube. Upon assembly, the flush port seal is allowed to expand inwardly along all of the inside walls 150 of the slot 146. The amount of compression required to provide a seal is approximately 15%. While the flush port seal is an adjustable feature, the amount of adjustment allowed is not sufficient to cause the expansion to exceed the elastic limit of the material.

Figure 8:
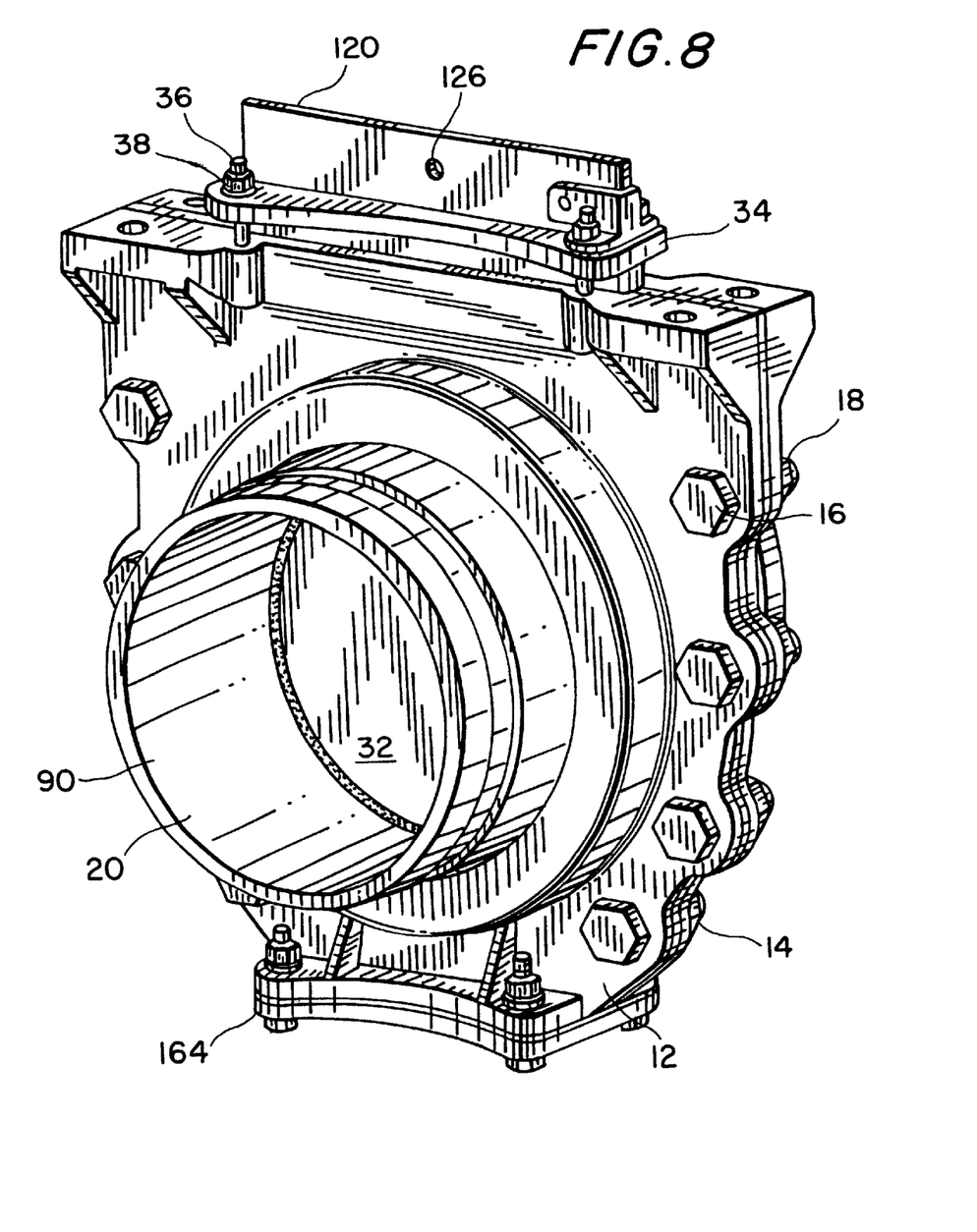
FIG. 8 is a perspective view of a main body assembly with a cover in place of a flush port attachment assembly for a knife gate valve according to the present invention.
Figure 11:
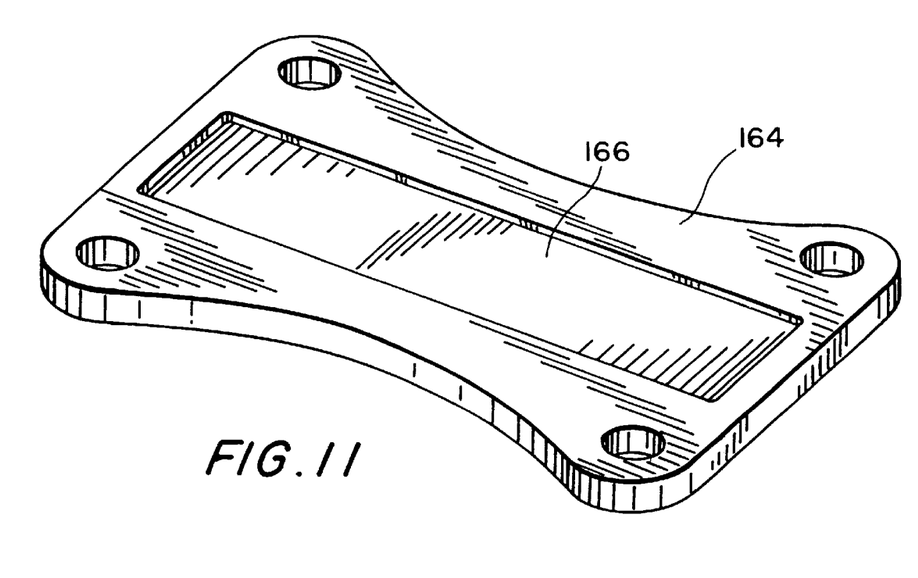
FIG. 11 is a detailed view of a flush port cover.

The valve can also be provided without the flush port assembly attachment, but with an enclosure plate or cover 164. (See FIG. 8) The enclosure plate is simply a flat plate configured to match the profile of the bottom of the assembly valve body. A recess 166 is machined on the top of the enclosure plate to match the profile of the flush port seal cavity (see FIG. 11). The enclosure plate is sealed against the valve body assembly by use of rectangular shaped compression seal. In this case, solids are collected in the flush port cavity, and would need to be cleaned out manually.

Figure 9:
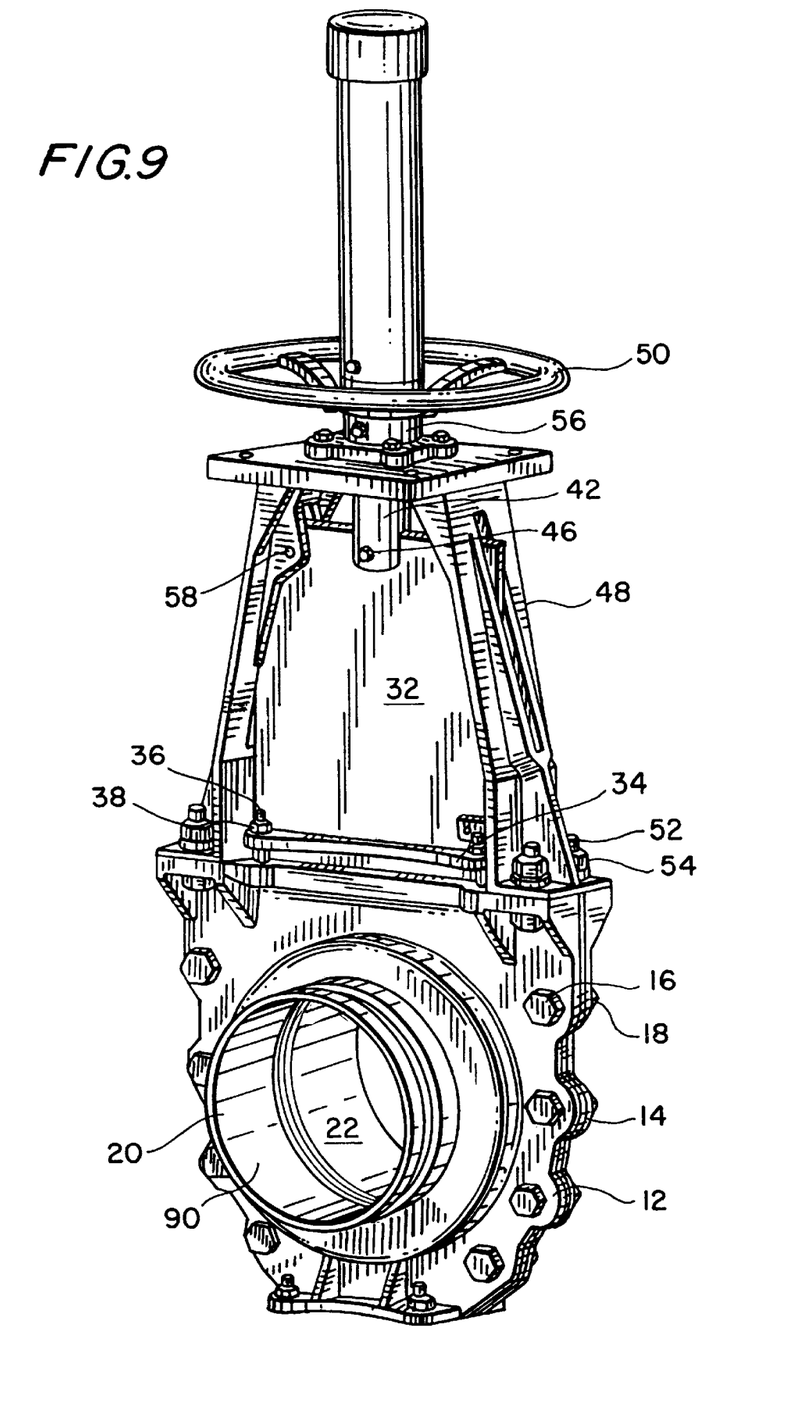
FIG. 9 is a perspective view of one embodiment of a knife gate valve according to the present invention shown in an open position, having grooved ends on the tubes of the modular ends, with the flush port attachment assembly removed, and provided with a manual actuation means.

A further embodiment is to provide the valve assembly without the flush port attachment assembly, as well as without the enclosure plate. In this case, the solids are allowed to drop from the bottom of the valve. (See FIG. 9).

The knife gate valve according to the invention provides numerous advantages over prior art valve, as described below.

Modular ends 20 and 22 comprise respective first and second tubes 90 and 92 preferably in the form of a pipe and adapted to connect with the end of a pipe in a piping network. Any type of pipe and means of attachment can be utilized. For example, the first and second tubes 90 and 92 may be:

a.) smooth, plain-end pipe;

b.) grooved-end pipe;

c.) threaded-end pipe;

d.) welded-end pipe;

e.) fused-end pipe;

f.) pipe with a spline coupler;

g.) pipe with a flanged connector;

h.) pipe with a bell and spigot connector; and i.) pipe with a socket connector.

Alternatively, both tubes may be the same kind of pipe or each may be a different kind of pipe. When the tubes are different the gate valve serves as an adapter between piping systems having different types of joints.

Each of the first and second tubes 90 and 92 may be made from material such as metal and plastic. Each end may be of the same material or a different material in any combination desired.

When the material of the tubes is a metal, any metal may be utilized. However, metals such as carbon steels, alloy steels, stainless steels, iron, and aluminum are preferred.

When the material of the tubes is a plastic, the plastic may be polyethylene (PE), polyvinyl chloride (PVC), chlorinated polyvinyl chloride (CPVC), polypropylene (PP), and fiber-reinforced plastic (also known as fiber-reinforced polymer) (FRP). A typical FRP is fiberglass.

When one tube is made from a metal and the other tube is made from a plastic, the metal may be selected from the group mentioned above, and the plastic may be selected from the group mentioned above.

Each of the first and second modular ends 20 and 22 further comprises respective flanges 94 and 96 best shown in FIGS. 3 and 4. Each flange has an inwardly facing side 94a, 96a, and an outwardly facing side 94b, 96b. The flanges 94 and 96 extend radially outwardly from the tubes 90 and 92 respectively. The outwardly facing sides 94a and 96a engage respective cup shaped recesses 114 and 116 in end plates 12 and 14 and are thus retained to the valve 10. The backface gasket rings 60 effect a seal between the flange sides 94a, 96a, and their respective end plates.

As shown in FIGS. 3 and 4 a seal pocket 98 is formed by adjacently positioned guide plate notches 100, and 102 located on both sides of the guide plates 28 and 30 at an upper edge thereof, and adjacently positioned gasket notches 104 and 106 located on each body gasket 66 and 68, at an upper edge thereof. To form the seal pocket 98 notches 100, 102, 104 and 106 are aligned with corresponding recesses 108 and 110 in each of the end plates 12 and 14. The recesses are located on the inwardly facing sides of the plates and at an upper edge thereof (see also FIG. 7). The seal pocket 98 contains compression packing 112, which forms a further fluid seal around the gate 32. The packing gland 34 is mounted on the upper part of the end plates 12 and 14 and forms a rectangular slot 35 which straddles the seal pocket 98. Packing gland 34 provides and regulates the amount of compression applied to the compression packing 112 to stop any leakage past the knife gate 32. The rectangular slot 35 provides a means of guiding the gate 32 as it travels through the packing gland.

The knife gate 32 is moved among its plurality of possible positions by a gate actuator assembly 40, shown in FIG. 1 as the threaded shaft 44 supported by the topworks bracket 48 and driven by the hand wheel 50. Other examples of actuator assemblies include a pneumatic actuators, a hydraulic actuators as well as electrical actuators, all well known in the art.

Gate valve 10 is serviceable without having to be removed from the conduit in which it is positioned.

Servicing is accomplished by making the end plates 12 and 14 detachable from the guide plates 28 and 30, thereby allowing the end plates to be separated to permit access to the valve seats 24 and 26 without having to remove modular ends 20 and 22 from the pipe or conduit to which they are attached. The gate valve 10 is thus split into two portions which remain attached to the conduit during servicing.

Embodiment Using Plastic Ends

In the case of assembly of the valve, using plastic end components, as is shown in FIG. 2, special considerations must be given to account for material properties inherent in plastic. Most thermoplastics, especially those used as piping material, are prone to high dimensional variations due to temperature changes, compared to metal.

Thermoplastics also possess a property known as viscoelasticity, which results in the material "flowing" under stress, over extended periods of time. Viscoelasticity is strain-stress-time-temperature dependent, but in summary, allows plastics to creep, or "flow", to a point approaching a zero stress state.

The gate valve according to the invention accounts for the dimensional changes due to thermal fluctuations by compressing the flanges 94 and 96 of modular ends 20 and 22 between the end plates and the seat spacer rings 62 and 64. The internal depth dimension of the cup-shaped recesses 114 and 116 of the end plates 12 and 14 is less than the combined thickness dimension of the flanges 94 and 96 of the modular ends 20 and 22 and the thickness of the seat spacer rings 62 and 64. The pre-compressed condition of the plastic flange is intended to prevent movement of the flange internally, especially during thermal expansion or contraction. The amount of compression placed on the flanged portion of the modular end is considerable enough to account for a 70° F. to 125° F. temperature change, depending on the flange thickness. The interaction of the plastic modular ends with the rubber of the seats also ensures that the seal will be retained and the plastic flange will retain its position, even during temperature changes, and especially during temperature drops that result in contraction.

By comparison, metallic modular ends are designed such that the thickness dimension of the flange when combined with the thickness of the seat ring equals the internal depth dimension of the cup shaped recess of the end plate.

Over extended periods of time, due to viscoelasticity, it is probable that the plastic material will flow to a negative strain condition (i.e. it will contract in the direction of applied stress), such that the stress in the flange will approach zero. In other words, the flange material "flows" in order to conform to the space provided during assembly. The amount of compression applied to the rubber seats during assembly is intended to compensate for this eventual state.

The outer lobe 78 of the seat, in essence, acts as a spring against the flange, slowly releasing energy over time, but ultimately ensuring that the plastic modular end will retain its fit within the valve body assembly. Internal pressure, under normal operating conditions, will also retard the flow of material, prolonging the effects of viscoelasticity.

Due to the significant difference between the wall thickness of metal pipe versus plastic pipe, and subsequently the difference in pipe inner diameters, the seat and seat spacer ring must be adjusted to accommodate the smaller i.d. typical in plastic pipe for the same nominal diameter. The proposed design can be supplied with an uninterrupted flow path through the valve by providing seats and seat rings in the assembly which are designed around plastic pipe dimensions. This feature is unique to the present invention design, as competitive products are only provided for metallic piping systems. The use of competitive products with external transition fittings results in an upset in the flow path, which can be detrimental due to an increased pressure drop, an area for sediment to collect, and an interruption which can create undesirable flow phenomena (i.e. vorticity and cavitation).

Embodiment with Resilient Seat Design

The valve seats are designed as one piece, double lobed, limited compression seats, such that compression is controlled during valve assembly, rather than during assembly of the valve into the piping system. The double lobed seat design provides functionality as a valve seat, as well as a seal to atmosphere when the gate is in the open position.

The seat spacer ring acts with the seat to provide limited compression on the outer lobe 78 of the seat. The limited compression of the seat is a result of the seat spacer ring acting as a spacer between the end plates and the center plates. When the valve is assembled, the end plates 12 and 14 are brought together until they meet the center plates 28 and 30. Internally, the flanges of the modular ends 20 and 22 are being driven toward the seat spacer rings, which are being driven toward the center plates. Meanwhile, the outer lobes 78 of the seats are being compressed between the flanges 94 and 96 and the seat spacer rings, and the inner lobes 76 are being driven toward each other.

The outer lobes effect a seal between the flanges and the seat spacer rings and close the leak path between these two components. The outer lobes also act to fix the seats in place, such that friction between the seats and the gate 32 due to vertical motion of the gate while closing, will not pull the seats from their proper position.

The inner lobes 76 effect a seal between the flanges 94 and 96 and the gate 32 with the gate in the closed position. With the gate in the open position the inner lobes seal against one another. In both the open and closed position, compression of the inner lobes during assembly transfers load through the seats to the sealing faces 72 of the seats, such that a seal to atmosphere is effected in either position.

The seats are comprised of an incompressible material (i.e. the seats must retain a constant volume, regardless of the shape they conform to), such that any compressive loads imparted on the seats are translated into volumetric displacement of the seat material. Any compressive loads imparted on the seat in the longitudinal direction, causing volumetric displacement of material, should result in the displacement of material in the two orthogonal directions, radial and circumferential about the flow path 86. According to one embodiment of the gate valve of the present invention, the seats are constrained in the outwardly radial direction by the seat rings and in the circumferential direction by the fact that the geometry of the part in this direction is a solid ring, preventing displacement. Therefore, the only possible direction the seat can deflect in response to longitudinal compression, while maintaining its incompressibility, is the inwardly radial direction, or toward the flow port of the valve.

The cavity 80 between the two lobes of the seat serves as a displacement cavity. The volume of the displacement cavity 80 is intentionally designed to be equal to, or slightly greater than, the volume of the compressed portion of the outer lobe of the seats, such that when the outer lobes are compressed during valve assembly, the material flows into the displacement cavity. The displacement cavity allows the material of the outer lobe to displace in the inwardly radial, without affecting the position, or displacement characteristics of the inner lobe.

In the fully open position, compression on the inner lobes 76 forces some material toward the opposing seat, some toward the internal cavity, or the flow path, of the valve, and some toward the displacement cavity 80 between the lobes. In the fully closed position, additional compression on the inner lobes resulting from displacement of seat material by the gate 32 which causes more significant volumetric displacement into the flow path of the valve. However, this additional displacement is not detrimental to the performance of the valve, since the flow will be stopped.

Gate valves according to the present invention feature highly modular construction. A variety of different types of end connections can be adapted to the valves by simply switching out the end components, and in some cases, also the seats and seat rings.

The gate valves according to the present invention incorporate limited compression seats, as well as a means for accommodating volumetric displacement.

Gate valves according to the invention are capable of being constructed to have plastic end components, especially made from polyethylene. The end components are assembled into the valve body, in a pre-stressed and fixed dimension condition, to account for dimensional changes due to thermal changes and viscoelasticity.

Gate valves according to the present invention are capable of being directly attached to plastic piping systems, especially polyethylene (PE), polyvinyl chloride (PVC), and chlorinated polyvinyl chloride (CPVC), by a variety of methods, including fusion, fusion welding, epoxy, or mechanical attachment via grooves, or other means.

Gate valves according to the present invention are capable of providing direct access to plastic piping systems by having internal diameters that directly match the piping system i.d., thereby providing an uninterrupted flow path through the valve.

Gate valves according to the present invention are capable of direct attachment to grooved piping systems without the need for external attachment of some transition fitting.

Gate valves according to the present invention can easily be disassembled and repaired in line, without having to be completely removed from the conduit or pipeline.

With gate valves of the present invention, it is possible to create a "cross-over" connection at the valve using different end types. For example, a valve can be provided with grooved metallic end on one side of the valve, and a plain end plastic end on the opposite side. Another typical combination incorporates a grooved metallic end on one side, with a plain metallic end on the opposite side.

None of the foregoing is intended to be in any way limiting of the present invention. Other additional embodiments of a gate valve according to and within the scope of the present invention will be apparent to persons of ordinary skill in the art. The scope of the present invention is established by the set of claims, which follows hereafter.

What is claimed is:

1. A knife gate valve having a flow path for fluid flow through said valve, said knife gate valve being attachable to a pipe end and comprising:

a knife gate having a planar surface oriented transversely to said flow path and movable within said valve transversely into and out of said flow path;

a pair of guide plates positioned along opposite edges of said knife gate for guiding its motion, said guide plates being substantially coplanar with said knife gate;

a seal surrounding said flow path and sealingly engaging said guide plates, said seal being sealingly engageable with said knife gate upon movement of said knife gate into said flow path;

an elongated tube positioned coaxially with said flow path, said tube having a flange positioned at one end thereof and extending radially outwardly therefrom, said one end of said tube facing said knife gate, said flange having a first surface facing said knife gate and sealingly engaging said seal and a second surface opposite said first surface;

an end plate having an opening adapted to receive said tube, said end plate having a surface surrounding said opening and engaging said second surface of said flange, said end plate being attached to said guide plates and capturing said flange and said seal therebetween, said tube extending outwardly from said end plate and being attachable to the pipe end; and means for moving said knife gate mounted on said valve.

2. A knife gate valve according to claim 1, wherein said tube has a circumferential groove positioned in spaced relation to an end opposite said flange, said groove adapting said tube for attachment to the pipe end by means of a mechanical pipe clamp.

3. A knife gate valve according to claim 1, wherein said tube and said flange are comprised of a metal.

4. A knife gate valve according to claim 1, wherein said tube and said flange are comprised of a plastic.

5. A knife gate valve according to claim 1, wherein said seal is comprised of an elastomeric material.

6. A knife gate valve according to claim 5, further comprising a spacer ring positioned coaxially with said flow path between said flange and said guide plates, said spacer ring having an inwardly facing shoulder engaging and radially supporting said seal and preventing motion of said seal when said knife gate is moved relatively thereto.

7. A knife gate valve according to claim 6, wherein said seal comprises:

a first lobe extending circumferentially around said seal and positioned between said flange and said spacer ring to effect a fluid tight seal therebetween;

a second lobe attached to said first lobe and extending circumferentially around said seal, said second lobe being positioned radially inwardly of said first lobe and engaging said flange;

a sealing face extending circumferentially around said seal and positioned opposite said second lobe for engagement with said knife gate;

a displacement cavity positioned between said first and said second lobes and extending circumferentially around said seal; and said first lobe being compressed between said flange and said spacer ring causing volumetric expansion of said sealing face against said knife gate and said second lobe against said flange for effecting a fluid tight seal therebetween.

8. A knife gate valve according to claim 7, wherein said spacer ring has a predetermined thickness for establishing a desired compression of said first lobe between said flange and said spacer ring and said sealing face against said knife gate, said desired compression being achieved when said spacer ring engages both said flange and said guide plates thereby separating said flange and said guide plates by said predetermined thickness of said spacer ring.

9. A knife gate valve according to claim 3 further comprising a second seal positioned between said second surface of said flange and said surface of said end plate, said second seal surrounding said flow path and sealing between said flange and said end plate.

10. A knife gate valve having a flow path for fluid flow through said valve, said knife gate valve being attachable to pipe ends and comprising:

a knife gate having a planar surface oriented transversely to said flow path and movable within said valve transversely into and out of said flow path;

a pair of guide plates positioned along opposite edges of said knife gate for guiding its motion, said guide plates being substantially coplanar with said knife gate;

first and second seals positioned on opposite sides of said knife gate and said guide plates, said seals surrounding said flow path and sealingly engaging said guide plates, said seals being sealingly engageable with said knife gate upon movement of said knife gate into said flow path and sealingly engageable with one another upon movement of said knife gate out of said flow path;

first and second elongated tubes positioned coaxially with said flow path on opposite sides of said knife gate, each of said tubes having a respective flange positioned at one end thereof and extending radially outwardly therefrom, said one end of each of said tubes facing said knife gate, each of said flanges having a first surface facing said knife gate and sealingly engaging one of said seals and a second surface opposite said first surface;

first and second end plates positioned on opposite sides of said knife plate, each of said end plates having a respective opening adapted to receive one of said tubes, each of said end plates having a respective surface surrounding said opening for engaging said second surface of one of said flanges of said tubes, said end plates being attached to said guide plates and capturing said flanges and said seals therebetween, said tubes extending outwardly from said end plates in opposite directions and being attachable to the pipe ends; and means for moving said knife gate mounted on said valve.

11. A knife gate valve according to claim 10, wherein one of said tubes has a circumferential groove positioned in spaced relation to an end opposite said flange, said groove adapting said one tube for attachment to the pipe end by means of a mechanical pipe clamp.

12. A knife gate valve according to claim 10, wherein one of said tubes and said flange on said one tube are comprised of a metal.

13. A knife gate valve according to claim 10, wherein one of said tubes and said flange on said one tube are comprised of a plastic.

14. A knife gate valve according to claim 10, wherein said seals are comprised of an elastomeric material.

15. A knife gate valve according to claim 14, further comprising first and second spacer rings positioned on opposite sides of said knife gate coaxially with said flow path, said first spacer ring being between one of said flanges and said guide plates, said second spacer ring being between another of said flanges and said guide plates, each of said spacer rings having an inwardly facing shoulder respectively engaging and radially supporting one of said seals and preventing motion of said seals when said knife gate is moved relatively thereto.

16. A knife gate valve according to claim 15, wherein each of said seals comprise:

a first lobe extending circumferentially around said seal and positioned between one of said flanges and said spacer rings to effect a fluid tight seal therebetween;

a second lobe attached to said first lobe and extending circumferentially around said seal, said second lobe being positioned radially inwardly of said first lobe and engaging one of said flanges;

a sealing face extending circumferentially around said seal and positioned opposite said second lobe for engagement with said knife gate;

a displacement cavity positioned between said first and said second lobes and extending circumferentially around said seal; and said first lobes being compressed between said flanges and said spacer rings causing volumetric expansion of said sealing faces against said knife gate and said second lobes against said flange for effecting a fluid tight seal therebetween when said knife gate is in said flow path, said sealing faces of each said seal being otherwise compressed into sealing contact with one another when said knife gate is removed from said flow path.

17. A knife gate valve according to claim 16, wherein said spacer rings each have a respective predetermined thickness for establishing a desired compression of said first lobes between said flanges and said spacer rings and said sealing faces against said knife gate, said desired compression being achieved when said spacer rings respectively engage both said flanges and said guide plates thereby separating said flanges and said guide plates by said predetermined thickness of said spacer rings.

18. A knife gate valve according to claim 12 further comprising a second seal positioned between said second surface of said flange on said one tube and said surface of said end plate engaging said second surface, said second seal surrounding said flow path and sealing between said flange on said one tube and said end plate.

19. A knife gate valve according to claim 10 further comprising an aperture positioned between said guide plates substantially in the plane of said knife gate, said aperture being positioned at a lowermost point of said knife gate valve and being in fluid communication with said flow path for allowing solids in said flow path to pass outwardly from said knife gate valve through said aperture.

20. A knife gate valve according to claim 19 further comprising a cover removably attachable to said knife gate to sealingly close said aperture, said cover being removable to allow solids accumulating in said aperture to be removed.

* * * * *